(12) United States Patent
Watanabe et al.

(10) Patent No.: US 7,373,220 B2
(45) Date of Patent: May 13, 2008

(54) ROBOT TEACHING DEVICE

(75) Inventors: Atsushi Watanabe, Tokyo (JP); Yoshiharu Nagatsuka, Yamanashi (JP); Jun Mizuno, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 392 days.

(21) Appl. No.: 10/787,168

(22) Filed: Feb. 27, 2004

(65) Prior Publication Data
US 2004/0199288 A1 Oct. 7, 2004

(30) Foreign Application Priority Data
Feb. 28, 2003 (JP) ............................. 2003-053577

(51) Int. Cl.
*G05B 19/00* (2006.01)
(52) U.S. Cl. ............... 700/264; 700/245; 700/256; 700/247; 700/53; 700/249; 318/568.1; 318/568.11; 318/568.12; 318/568.13; 318/568.19; 901/1; 901/3; 901/6; 901/15; 901/49
(58) Field of Classification Search ........... 700/264
See application file for complete search history.

(56) References Cited

U.S. PATENT DOCUMENTS

| 4,517,652 | A | * | 5/1985 | Bennett et al. ............. 700/264 |
| 4,761,745 | A | * | 8/1988 | Kodaira ..................... 700/254 |
| 5,495,410 | A | * | 2/1996 | Graf ............................ 700/86 |
| 5,798,627 | A | * | 8/1998 | Gilliland et al. ....... 318/568.14 |
| 5,880,956 | A | * | 3/1999 | Graf ............................ 700/86 |

(Continued)

FOREIGN PATENT DOCUMENTS

EP 0 792 726 A1 9/1997
EP 0 864 401 A1 9/1998
EP 1 247 623 A2 10/2002
JP 01269105 A * 10/1989
JP 09212228 A * 8/1997
JP 2003-150219 5/2003

OTHER PUBLICATIONS

Lowe et al., Web system for control of mechatronic devices, IEEE, vol. 3, Dec. 2-5, 2002 pp. 1464-1469 vol. 3.*
Wu et al., F3 Robotr technical manual, 2000, Internet, pp. 1-18.*
European Search Report issued Oct. 18, 2007 in corresponding European Patent Application No. 04251125.3-1239.

*Primary Examiner*—Thomas Black
*Assistant Examiner*—McDieunel Marc
(74) *Attorney, Agent, or Firm*—Staas & Halsey LLP

(57) ABSTRACT

A teaching device and a teaching modification device capable of easily attaining conformity between an operation program of a robot prepared by off-line programming and an actual operation of the robot. A layout of a robot system including three-dimensional models of the robot and peripheral objects thereof (table, a workpiece, etc.) are prepared by an off-line programming system and taught points are defined for the workpiece. The system layout and a model of the workpiece are displayed on a display device of a teaching pendant. An operator specifies a present position of the operator in the system layout and a taught point to be modified referring to the display device. A line-of-sight vector is automatically calculated and the model of the workpiece as viewed from a direction of the line-of-sight is displayed on the display device. Thus, the operator can operate the robot for modifying positions of the taught points or orientations at the taught points with ease, referring to the three-dimensional model of the workpiece and the taught points on the display device as viewed from the present position of the operator.

10 Claims, 5 Drawing Sheets

U.S. PATENT DOCUMENTS

| | | | |
|---|---|---|---|
| 6,330,495 B1 * | 12/2001 | Kaneko et al. | 700/264 |
| 6,332,102 B1 * | 12/2001 | Nakajima et al. | 700/245 |
| 6,356,806 B1 * | 3/2002 | Grob et al. | 700/245 |
| 6,509,576 B2 * | 1/2003 | Woo-Dong | 250/559.33 |
| 6,522,949 B1 * | 2/2003 | Ikeda et al. | 700/245 |
| 6,597,971 B2 * | 7/2003 | Kanno | 700/245 |
| 6,836,700 B2 * | 12/2004 | Greene et al. | 700/245 |
| 6,853,881 B2 * | 2/2005 | Watanabe et al. | 700/264 |

* cited by examiner

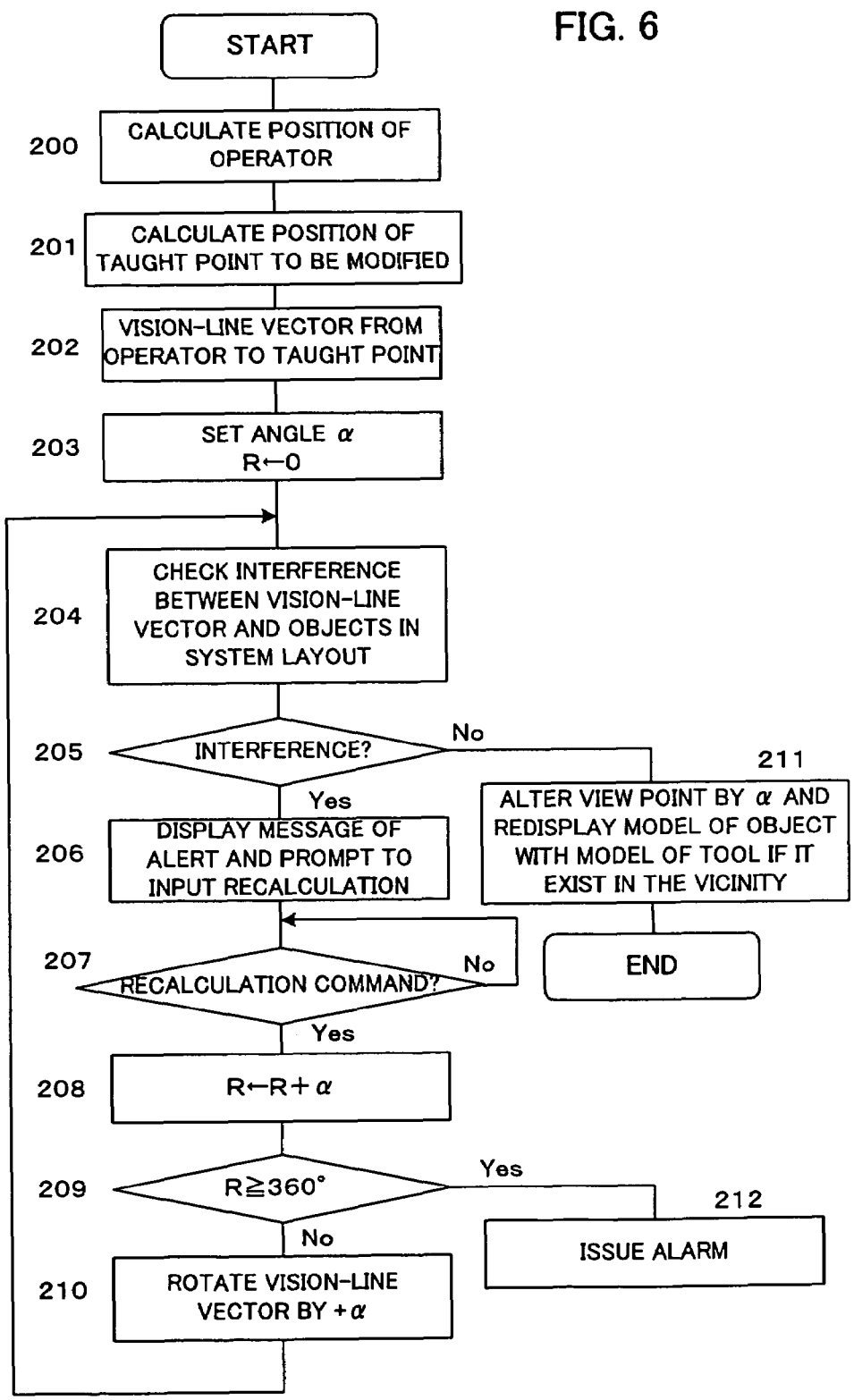

ROBOT TEACHING DEVICE

BACKGROUND OF THE INVENTION

1. Field of the Invention

The present invention relates to a teaching device for performing teaching operation of a robot and also a teaching modification device for modifying positions of taught points or orientation at the taught points in an operation program of the robot prepared by an off-line programming system.

2. Description of Related Art

In preparing an operation program for an industrial machine such as a robot based on three-dimensional models of a robot, peripheral devices, an operation tool and an object of operation such as a workpiece using an off-line programming system, it is usual that there is a considerable error between an operation path according to the operation program and an intended operation path. Therefore, in practice, the prepared operation program is modified by successively positioning a distal end of an operation tool or a position correction tool on the workpiece (so called tough-up operation) in the real robot system. Further, there has been proposed a method of modifying position/orientation of models of a workpiece or peripheral devices prepared by the off-line programming system based on actual positions of the workpiece and peripheral devices detected by sensors in JP 2003-150219A.

Further, it has been put into practice to detect three points defining position/orientation of the workpiece by sensors such as visual sensors to shift a taught path in the operation program. However, in this method adopting the visual sensors mounted on the robot, the visual sensor is moved by operating the robot manually using jog feed function of the robot on the try-and-error basis such that three points can be captured by the visual sensor.

In the conventional techniques, in addition to preparation of an operation program by the off-line programming system at a place such as offices remote from a place of practice such as factory, arrangement and adjustment of operational machine such as robot, peripheral devices, sensors for detecting position/orientation of a workpiece are required, and further it is necessary to perform modification of the operation program by the touch-up operation or shifting of the operation path for conforming the operation path by the operation program prepared by the off-line programming with an actual operation path of the robot. Thus, it takes a considerable time for an operator to perform these cumbersome operations.

SUMMARY OF THE INVENTION

The present invention provides a teaching device capable of easily performing a teaching operation for teaching a robot of positions for performing an operation on an object, and also a teaching modification device capable of easily performing modification of positions of the taught points or orientations at the taught point for performing an operation on an object.

According to one aspect of the present invention, the teaching device comprises: storage means storing positional relation between of the robot and the object; first displaying means for displaying a model of the robot on a display device movable around the object with an operator; specifying means for the operator to specify a direction of a present position of the operator with respect to the robot, referring to the model of the robot displayed on the display device; second displaying means for displaying a three-dimensional model of the object as viewed from the specified direction of the operator on the display device; and manual operation means for the operator to operate the robot for designating positions for performing the operation on the object, referring to the three-dimensional model of the object displayed on the display device.

According to another aspect of the present invention, a teaching modification device comprises: storage means storing positional relation among the robot, the object and the taught points; first displaying means for displaying a model of the robot on a display device movable around the object with an operator; specifying means for the operator to specify a direction of a present position of the operator with respect to the robot, referring to the model of the robot displayed on the display device; second displaying means for displaying a three-dimensional model of the object and the taught points as viewed from the specified direction of the operator on the display device; and manual operation means for the operator to operate the robot for modifying positions of the taught points or orientations at the taught points, referring to the three-dimensional model of the object and the taught points displayed on the display device.

According to still another aspect of the present invention, a teaching device comprises: storage means storing positional relation between of the robot and the object; first displaying means for displaying a model of the object on a display device movable around the object with an operator; specifying means for the operator to specify a direction of a present position of the operator with respect to the object, referring to the model of the object displayed on the display device; second displaying means for displaying an image of a three-dimensional model of the object as viewed from the specified direction of the operator on the display device; and manual operation means for the operator to operate the robot for designating positions for performing the operation on the object, referring to the three-dimensional model of the object displayed on the display device.

According to yet another aspect of the present invention, a teaching modification device comprises: storage means storing positional relation among the robot, the object and the taught points; first displaying means for displaying a model of the object on a display device movable around the object with an operator; specifying means for the operator to specify a direction of a present position of the operator with respect to the object, referring to the model of the robot displayed on the display device; second displaying means for displaying a three-dimensional model of the object and the taught points as viewed from the specified direction of the operator on the display device; and manual operation means for the operator to operate the robot for modifying positions of the taught points or orientations at the taught points, referring to the three-dimensional model of the object and the taught points displayed on the display device.

According to further aspect of the present invention, storage means storing positional relation among the robot, the object and the taught points; displaying means for displaying a three-dimensional model of the object and the positions of the taught points on a display device movable around the object with the operator; selecting means for the operator to select one of the taught points displayed on the display device; determining means for determining whether or not the selected taught point is visible without interference on the display device in a direction of a present line of sight on the three-dimensional model; and altering means for altering the line of sight on the three-dimensional model on the display device such that the selected taught point is visible without interference in the direction of the altered line of sight when it is determined that the selected taught point is not visible on the display device by the determining means.

At least a part of a model of a tool attached to the robot may be displayed on the display device with the three-dimensional model of the object, when the robot is operated such that the tool is located in the vicinity of the object.

BRIEF DESCRIPTION OF THE DRAWINGS

FIG. 6 is a flowchart showing an algorithm for calculating a vision-line vector.

DETAILED DESCRIPTION

Figure 1:
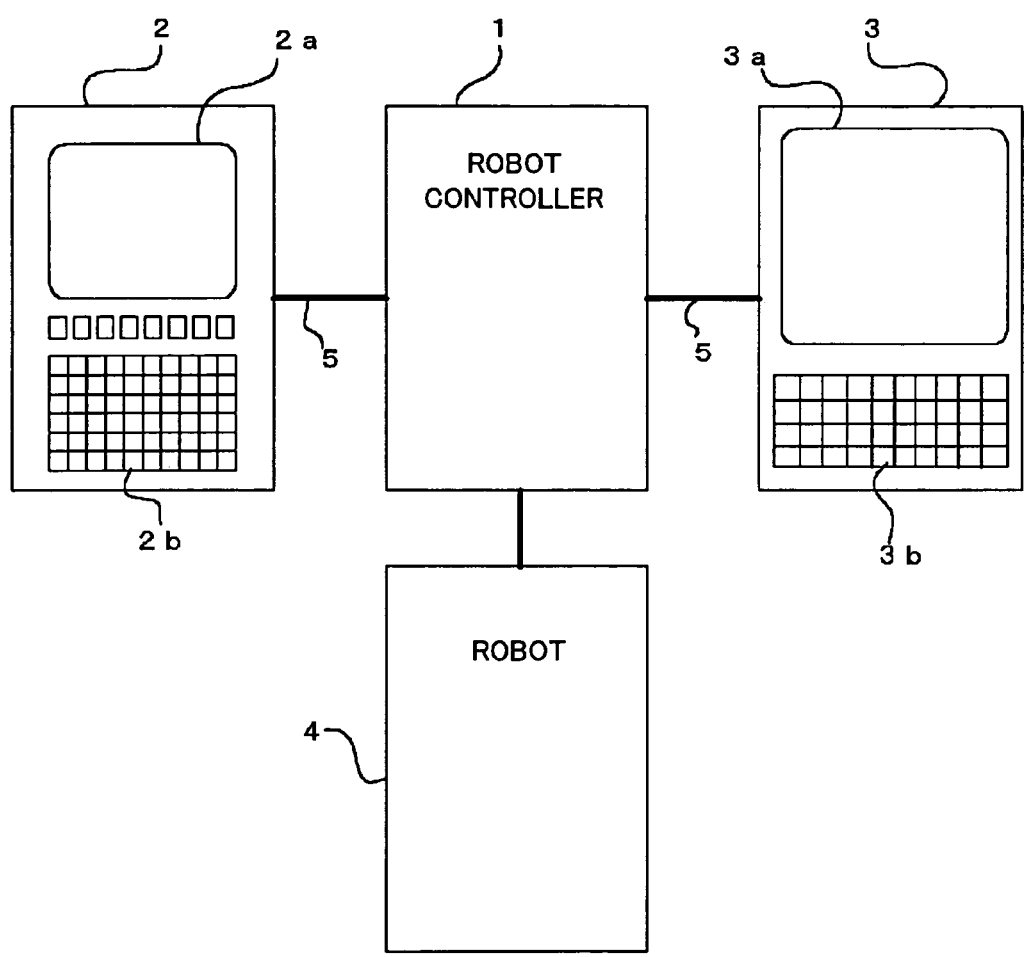
FIG. 1 is a schematic view of a teaching device according to an embodiment of the present invention.

FIG. 1 schematically shows a teaching device for performing teaching operation and also modification of taught positions according an embodiment of the present invention. A robot controller 1 connected with a robot 4 controls the robot 4 to operate respective mechanisms of the robot 4 such as robot arms in a conventional manner. A computer (a personal computer in this embodiment, which will be referred to as PC) serving as information processing device and a teaching pendant 2 are connected to the robot controller 1 through cables 5. The communication between the robot controller 1 and the teaching pendant 2 and the PC 3 may be performed by communication using Ethernet (registered trademark) cables or RS-422 cables. In the case of adopting the Ethernet, the communication between the teaching pendant 2 and the PC3 can be performed directly and in the case of adopting the RS-422, the communication between the teaching pendant 2 and the PC3 is performed indirectly through the robot controller 1.

The teaching pendant 2 has a display section 2a constituted by a display device such as a liquid crystal display and an input operation section 2b constituted by soft keys and keys for inputting various command and data. The teaching pendant 2 is portable to be movable around an object of operation with an operator. In the input operation section 3b, there are provided keys for commanding a start and a stop of simulation of an operation of the robot, operation mode switches for selecting outputting of motion commands for the robot to the servo controller for drivingly controlling servomotors for respective axes, to the PC 3, or to both of the servo controller and the PC 3, display condition altering keys for altering data on display condition of animations stored in the PC 3, and operation mode selecting switch for selecting operations regarding the simulation at the teaching pendant 2, at PC 3, or at both of the teaching pendant 2 and the PC 3.

The PC 3 have a display section 3a and an input operation section 3b such as a key board likewise a conventional personal computer, and there are provided keys for commanding a start and a stop of the simulation, operation mode switches for selecting outputting of the motion command to the servo controller, to the PC 3, or to both of the servo controller and the PC 3, and operation mode selecting switch for selecting operations regarding the simulation at the teaching pendant 2, or at PC 3, or at both of the teaching pendant 2 and the PC 3.

Figure 2:
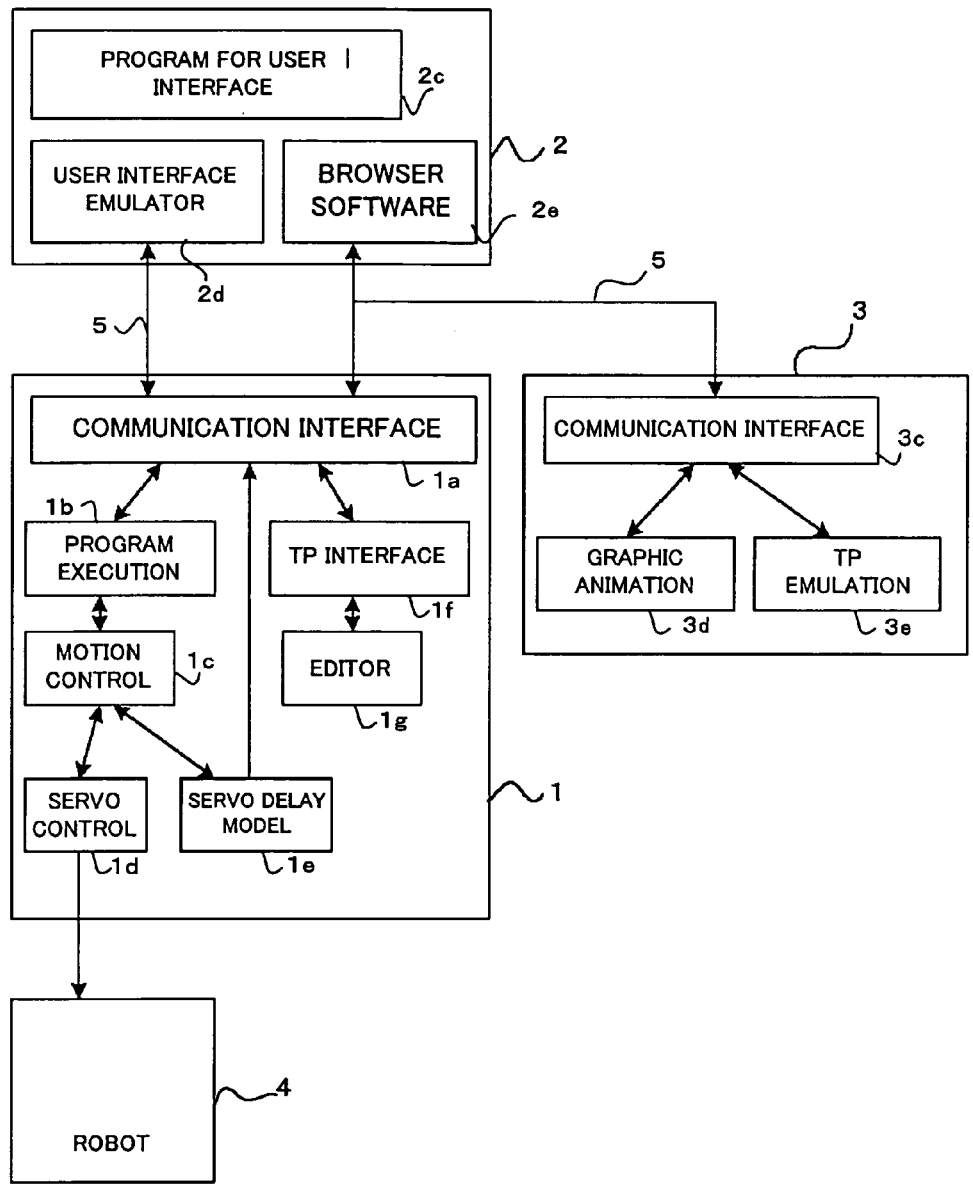
FIG. 2 is a schematic diagram of software configuration in the embodiment.

FIG. 2 is a functional block diagram representing functions of the robot controller 1, the teaching pendant 2 and the PC 3 achieved by software processing.

In the robot controller 1, there are provided a communication interface 1a, a software function 1b for execution of a program, a motion section 1c for creating operation position information of the robot based on the program execution, a servo control section 1d for drivingly controlling servomotors for respective axes of the robot 4, a servo delay model 1e for obtaining information on an operation position for the animation with a servo delay compensated, an interface If for the teaching pendant (TP), and an editor 1 g, ect.

The teaching pendant 2 is provided with a program 2c for user interface, an emulator 2d for user interface, a software 2e for browser, etc. The PC 3 is provided with a communication interface 3c, a graphic animation section 3d, and an emulator 3e for the teaching pendant.

In the example shown in FIG. 2, the robot controller 1, the teaching pendant 2 and the PC 3 are connected by the Ethernet cable 5.

Figure 3:
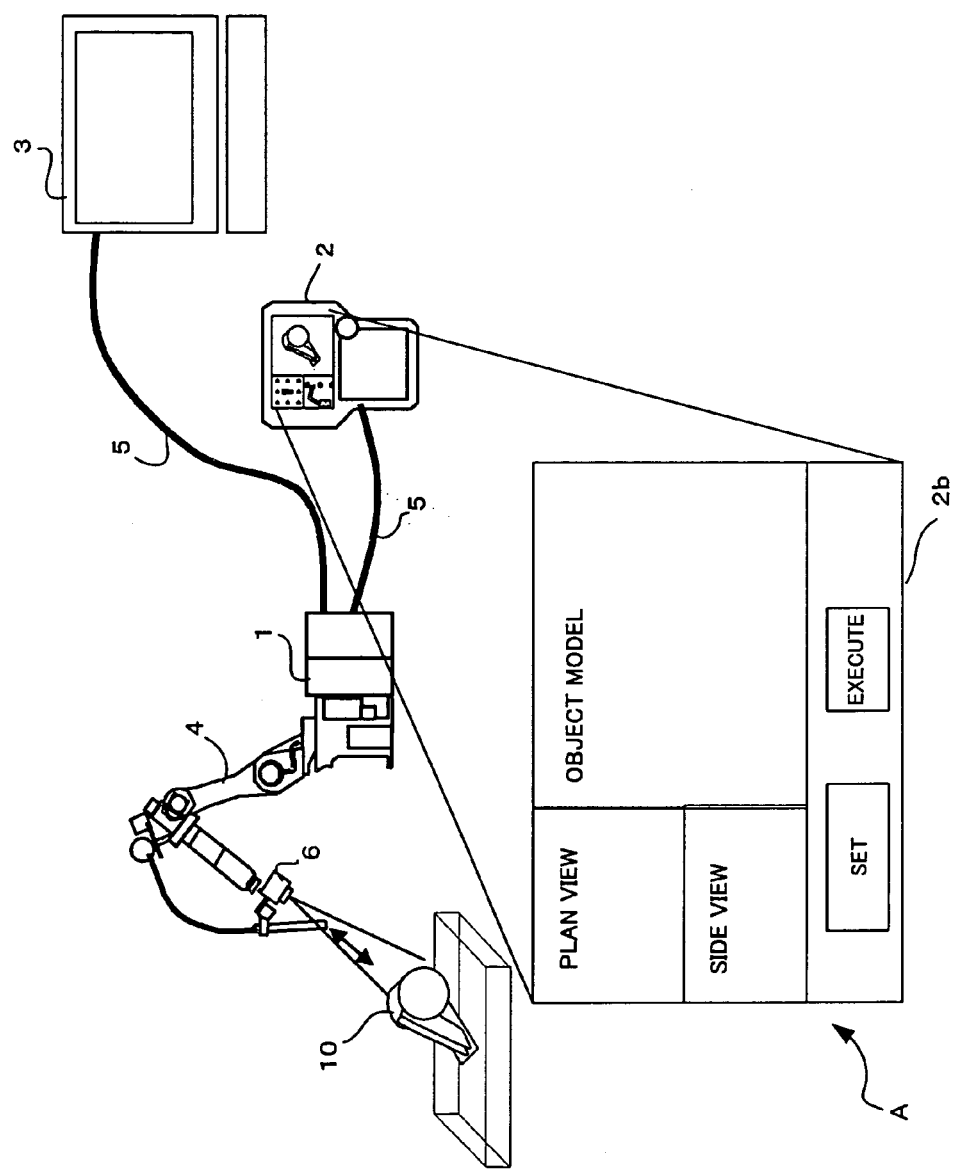
FIG. 3 is a schematic diagram of the teaching device in performing modification of taught points using a camera attached to a distal end of a robot arm.

FIG. 3 schematically shows an example of an operation of modification of taught points with respect to a part 10 as an object of operation by the robot using a CCD camera 6 as a visual sensor attached to a distal end of an arm of the robot 4. As shown in an enlarged view A of the display section 2a of the teaching pendant 2, a plan view and a side view of a layout of the robot system, and a model of the object of operation and a part of the robot system are displayed in the display section 2a.

The system layout constituted by three-dimensional models of the robot, peripheral devices, an object of operation, and an operational tool are prepared in advance by the off-line programming system. The three-dimensional models of the peripheral devices and the object of operation may be prepared in the teaching pendant using two-dimensional graphic data prepared by a CAD device. The three-dimensional models of the robot and the tool are prepared using the graphic data stored in the storage device.

Then, points for the robot operation are taught in the off-line programming system to create an operation program of the robot. Confirmation of the robot operation is performed by the simulation and the confirmed operation program is used for application in the operation place such as factory. In the confirmation, the three-dimensional models of the robot, the peripheral devices, the workpiece and the tool are arranged on the display device 3a of the PC 3. It is expected that the layout of the respective models on the display device 3a approximately correspond to a real layout of the corresponding elements (the robot, the peripheral devices, the workpiece and the tool) or dummies of these elements.

However, in the actual cases, the layout on the display device 3a may be displaced from the actual layout because of errors in data, adjustment of the actual layout in the factory, etc. The present invention enables easy correction of the displacement between the layout of the models and the actual layout of the corresponding elements.

Figure 4:
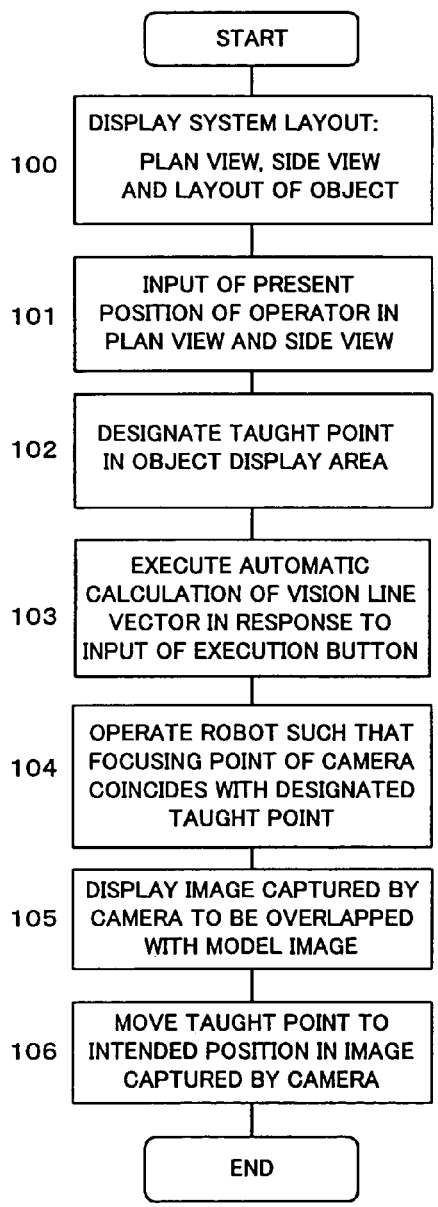
FIG. 4 is a flowchart showing an operation algorithm in the embodiment.

FIG. 4 shows modification processing of the positions of the taught points and/or orientations at the taught points according to the embodiment.

First, the layout of the models of the robot, the object of operation, and the peripheral devices which are stored in the PC 3 is displayed on the display section 2a of the teaching pendant 2 (Step 100). Specifically, a plan view of the robot system is displayed in a plan-view area of the display section 2a, a side view of the robot system is displayed in the side-view area of the display section 2a, and three-dimensional models of the object withe the taught points, and a part of the robot system in the vicinity of the object are displayed in the object display area of the display section 2a.

Then, an operator inputs a present position of the operator to specify a direction of the operator with respect to the robot (Step 101). Specifically, the operator specifies a place where the operator presently exists by moving a cursor to a position where the operator exists in the plan-view area and the side-view area in the display section 2a and clicks the set button, to designate the direction of the operator with respect to the robot. With this operation, a position of a view point is determined by the direction of the operator with respect to the robot. Then, the operator designates a taught point in the object display area (Step 102). When the operator clicks the execute button to start automatic calculation of a line-of-sight vector, a three-dimensional model of the object as viewed from the present view point of the operator is displayed in the object display area of the display section 2a (Step 103). In this processing, if the designated taught point is not visible from the view point of the operator, a three-dimensional model of the object as viewed form a view point where the designated taught point is visible without obstacles. The automatic calculation of the line-of-sight vector will be described later in detail.

Then, the operator operates the robot so that the designated taught point is captured within a field of view of the camera 6 (Step 104), and an image of the object captured by the camera 6 is displayed at the object display area to be overlapped with the model of the object (Step 105). Then, the operator moves the designated taught point in the object display area to an intended position for the taught point in the image of the object, and click the set button so that the position of the taught point is stored as a modified position of the designated taught point (Step 106).

Alternatively to or in addition to the above procedure, a distal end of an operation tool or a position correction tool attached to the robot may be positioned at the intended point for the taught point, to modify the position of the taught point in the operation program using coordinate values of a control point of the robot.

The above processing is performed on the taught points to be modified in the robot operation program prepared by the off-line programming system. Thus, the taught points prepared by the off-line programming system are modified to cancel the displacement between intended positions for performing an operation on the object and the taught positions for the operation in the robot operation program.

Figure 5:
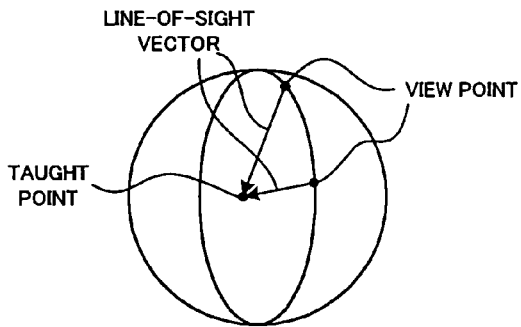
FIG. 5 is a schematic diagram showing rotational shift of a view point.

The processing for automatic calculation of the line-of-sight vector in Step 103 in FIG. 5 will be described in detail referring to FIG. 6.

The position of the operator is calculated based on the specified position of the operator in the plan-view area and the side-view area (Step 200). Then, the position of the taught point to be modified designated by the operator is calculated (Step 201), and a line-of-sight vector from the view point as the specified position of the operator to the designated taught point (Step 202). A rotational angle α for changing the view point is set and a register R for storing the rotational angle is cleared to "0" (Step 203).

Next, it is checked whether or not the line-of-sight vector from the view point to the designated taught point interferes with components in the system layout (Step 204). Specifically, it is checked whether or not the taught point is visible from the view point without interference with the components. If it is determined that there is any interference, an alert and a message to prompt the operator to input a command for recalculation of the line-of-sight vector is displayed on the display section 2a of the teaching pendant 2 (Step 206).

When a command for recalculation of the line-of-sight is inputted, the set rotational angle α is added to the value of the register R to be accumulated (Step 208), and it is determined whether or not the value of the register R exceeds 360° (Step 209). If the value of the register R is less than 360°, a position rotated by an angle obtained by adding the angle α to the set angle is set as a new view point (Step 210). In this processing, a new view point is determined by calculating a position to rotate the line-of-sight vector by the angle +α in a direction of a latitudinal or longitude line of a sphere having a radius from the view point to the designated taught point, as shown in FIG. 5. Then, the procedure returns to step 204 and repeatedly executes the foregoing processing.

If it is determined that the value of the register R is not less than 360° in Step 209, it is deemed that the designated taught point can not been seen from this position without obstacles even if the view point is changed, and an alert is issued (Step 212). The reference value in the determination in Step 209 may not be necessarily set to 360°. In this embodiment, the reference value is set to 360° with safety margin.

Thus, the view point at which the operator can see the designated taught point without obstacles is determined and the procedure proceeds from Step 205 to Step 211. At Step 211, a renewed image of the object as viewed from the determined view point is displayed at the object display section. In the object display screen, the tool attached to the distal end of the robot arm is displayed in the field of view of the object display section if the tool is within the field of view.

With the above procedure, the view point where the operator can see the designated taught point without obstacles is determined, and the model of the object as viewed from the view point is displayed at the object display section, the position/orientation of the designated taught point is corrected by performing the processing of Step 105 and the subsequent Steps in FIG. 4.

In the foregoing embodiment, the direction of the operator with respect to the robot is specified by inputting a position of the operator on the plan view and the side view of the robot layout in the display section 2a of the teaching pendant 2. The direction of the operator with respect to the object may be specified by inputting a position of the operator on the plan view and the side view of the object of operation in the display section 2a of the teaching pendant 2.

Further, the modification processing of positions of the taught points and/or orientations at the taught points is described in the foregoing embodiment. An teaching operation for designating positions for performing the operation on the object by the robot may be performed by an operator to manually operating the robot referring to the three-dimensional model of the object displayed on the display section 2a of the teaching pendant 2.

According to the present invention, position of a point to be taught or the taught position to be modified with respect to an object of operation is sentiently and easily recognized by an operator by referring to the three-dimensional models as viewed form a direction of a line-of-sight of an operator displayed on the display device of the teaching pendant.

What is claimed is:

1. A teaching device for teaching a robot of positions for performing an operation on an object, comprising:

storage means storing positional relation between of the robot and the object;

first displaying means for displaying a model of the robot on a display device movable around the object with an operator;

specifying means for the operator to specify a direction of a present position of the operator with respect to the robot, referring to the model of the robot displayed on the display device;

second displaying means for displaying a three-dimensional model of the object as viewed from the specified direction of the operator on the display device; and manual operation means for the operator to operate the robot for designating positions for performing the operation on the object, referring to the three-dimensional model of the object displayed on the display device.

2. A robot teaching device according to claim 1, wherein at least a part of a model of a tool attached to the robot is displayed on the display device with the three-dimensional model of the object, when the robot is operated such that the tool is located in the vicinity of the object.

3. A teaching modification device for modifying positions of taught points or orientations at the taught points for performing an operation on an object by a robot, comprising:

storage means storing positional relation among the robot, the object and the taught points;

first displaying means for displaying a model of the robot on a display device movable around the object with an operator;

specifying means for the operator to specify a direction of a present position of the operator with respect to the robot, referring to the model of the robot displayed on the display device;

second displaying means for displaying a three-dimensional model of the object and the taught points as viewed from the specified direction of the operator on the display device; and manual operation means for the operator to operate the robot for modifying positions of the taught points or orientations at the taught points, referring to the three-dimensional model of the object and the taught points displayed on the display device.

4. A robot teaching device according to claim 3, wherein at least a part of a model of a tool attached to the robot is displayed on the display device with the three-dimensional model of the object, when the robot is operated such that the tool is located in the vicinity of the object.

5. A teaching device for teaching a robot of positions for performing an operation on an object, comprising:

storage means storing positional relation between of the robot and the object;

first displaying means for displaying a model of the object on a display device movable around the object with an operator;

specifying means for the operator to specify a direction of a present position of the operator with respect to the object, referring to the model of the object displayed on the display device;

second displaying means for displaying an image of a three-dimensional model of the object as viewed from the specified direction of the operator on the display device; and manual operation means for the operator to operate the robot for designating positions for performing the operation on the object, referring to the three-dimensional model of the object displayed on the display device.

6. A robot teaching device according to claim 5, wherein at least a part of a model of a tool attached to the robot is displayed on the display device with the three-dimensional model of the object, when the robot is operated such that the tool is located in the vicinity of the object.

7. A teaching modification device for modifying positions of taught points or orientations at the taught points for performing an operation on an object by a robot, comprising:

storage means storing positional relation among the robot, the object and the taught points;

first displaying means for displaying a model of the object on a display device movable around the object with an operator;

specifying means for the operator to specify a direction of a present position of the operator with respect to the object, referring to the model of the robot displayed on the display device;

second displaying means for displaying a three-dimensional model of the object and the taught points as viewed from the specified direction of the operator on the display device; and manual operation means for the operator to operate the robot for modifying positions of the taught points or orientations at the taught points, referring to the three-dimensional model of the object and the taught points displayed on the display device.

8. A robot teaching device according to claim 7, wherein at least a part of a model of a tool attached to the robot is displayed on the display device with the three-dimensional model of the object, when the robot is operated such that the tool is located in the vicinity of the object.

9. A teaching modification device for modifying positions of taught points or orientations at the taught points for performing an operation on an object by a robot, comprising:

storage means storing positional relation among the robot, the object and the taught points;

displaying means for displaying a three-dimensional model of the object and the positions of the taught points on a display device movable around the object with the operator;

selecting means for the operator to select one of the taught points displayed on the display device;

determining means for determining whether or not the selected taught point is visible without interference on the display device in a direction of a present line of sight on the three-dimensional model; and altering means for altering the line of sight on the three-dimensional model on the display device such that the selected taught point is visible without interference in the direction of the altered line of sight when it is determined that the selected taught point is not visible on the display device by said determining means.

10. A robot teaching device according to claim 9, wherein at least a part of a model of a tool attached to the robot is displayed on the display device with the three-dimensional model of the object, when the robot is operated such that the tool is located in the vicinity of the object.

* * * * *

UNITED STATES PATENT AND TRADEMARK OFFICE
CERTIFICATE OF CORRECTION

| | |
|---|---|
| PATENT NO. | : 7,373,220 B2 |
| APPLICATION NO. | : 10/787168 |
| DATED | : May 13, 2008 |
| INVENTOR(S) | : Atsushi Watanabe et al. |

It is certified that error appears in the above-identified patent and that said Letters Patent is hereby corrected as shown below:

Title page, Column 2 (Other Publications), Line 3, change "Robotr" to --Robot--.

Column 1, Line 33, after "using" insert --a--.

Column 1, Line 61, after "between" delete "of".

Column 2, Line 25, after "between" delete "of".

Column 2, Line 54, change "aspect" to --aspects--.

Column 3, Line 34, after "as" insert --an--.

Column 3, Line 37, change "1 and" to --1,--.

Column 3, Line 55, after "both" delete "of".

Column 3, Line 60, after "both" delete "of".

Column 3, Line 67, after "both" delete "of".

Column 4, Line 3, after "both" delete "of".

Column 4, Line 16, change "If" to --1f--.

Column 4, Line 17, change "1 g, ect." to --1g, etc.--.

Column 5, Line 6, change "withe" to --with--.

Column 5, Line 26, change "form" to --from--.

Column 6, Line 17, change "longitude" to --longitudinal--.

UNITED STATES PATENT AND TRADEMARK OFFICE
CERTIFICATE OF CORRECTION

| | | |
|---|---|---|
| PATENT NO. | : 7,373,220 B2 | |
| APPLICATION NO. | : 10/787168 | |
| DATED | : May 13, 2008 | |
| INVENTOR(S) | : Atsushi Watanabe et al. | |

It is certified that error appears in the above-identified patent and that said Letters Patent is hereby corrected as shown below:

Column 6, Line 24, change "can not been" to --cannot be--.

Column 6, Line 56, change "An" to --A--.

Column 6, Line 66, change "form" to --from--.

Column 7, Line 4, after "storing" insert --a--.

Column 7, Line 4, after "between" delete "of".

Column 7, Line 6, after "for displaying" insert --an image of--.

Column 7, Line 7, after "movable" insert --, with an operator,--.

Column 7, Lines 7-8, delete "with an operator".

Column 7, Line 9, change "for the operator to specify" to --operable by the operator for specifying--.

Column 7, Line 13, after "displaying" second occurrence insert --an image of--.

Column 7, Line 14, after "object" insert --,--.

Column 7, Line 15, after "operator" insert --,--.

Column 7, Line 16, after "means for" insert --enabling--.

Column 7, Line 17, after "robot" insert --manually--.

Column 7, Line 18, after "to the" insert --image of the--.

Column 7, Line 22, before "a part of" insert --an image of--.

UNITED STATES PATENT AND TRADEMARK OFFICE
CERTIFICATE OF CORRECTION

PATENT NO.         : 7,373,220 B2
APPLICATION NO. : 10/787168
DATED                 : May 13, 2008
INVENTOR(S)       : Atsushi Watanabe et al.

It is certified that error appears in the above-identified patent and that said Letters Patent is hereby corrected as shown below:

Column 7, Line 23, after "with the" insert --display of the--.

Column 7, Line 26, after "for modifying" insert --at least one of--.

Column 7, Line 27, change "or" to --and--.

Column 7, Line 27, after "at the taught points" insert --,--.

Column 7, Line 29, change "storing" to --for storing a--.

Column 7, Line 31, after "for displaying" insert --an image of--.

Column 7, Line 32, change "device movable" to --device, movable with an operator--.

Column 7, Lines 32-33, change "object with an operator;" to --object;--.

Column 7, Line 34, change "for the operator to specify" to --operable by the operator for specifying--.

Column 7, Line 38, after "for displaying" insert --an image of--.

Column 7, Line 39, after "taught points" insert --,--.

Column 7, Line 40, after "operator" insert --,--.

Column 7, Line 43, after "robot" insert --manually--.

Column 7, Line 43, after "modifying" insert --at least one of--.

Column 7, Line 43, change "or" to --and--.

UNITED STATES PATENT AND TRADEMARK OFFICE
CERTIFICATE OF CORRECTION

| | |
|---|---|
| PATENT NO. | : 7,373,220 B2 |
| APPLICATION NO. | : 10/787168 |
| DATED | : May 13, 2008 |
| INVENTOR(S) | : Atsushi Watanabe et al. |

It is certified that error appears in the above-identified patent and that said Letters Patent is hereby corrected as shown below:

Column 7, Line 44, after "referring to the" insert --image of the--.

Column 7, Line 48, before "a part of" insert --an image of--.

Column 7, Line 49, after "with the" insert --display of the--.

Column 7, Line 54, after "storing" insert --a--.

Column 7, Line 54, after "between" delete "of".

Column 7, Line 56, after "for displaying" insert --an image of--.

Column 7, Line 57, change "movable" to --movable, with an operator,--.

Column 7, Lines 57-58, change "object with an operator;" to --object;--.

Column 7, Line 59, change "for the operator to specify" to --operable by the operator for specifying--.

Column 8, Line 1, after "means for" insert --enabling--.

Column 8, Line 3, after "referring to" insert --the image of--.

Column 8, Line 7, before "a part of" insert --an image of--.

Column 8, Line 8, after "with the" insert --display of the--.

Column 8, Line 12, change "points or orientations at the taught points" to --points, or orientations at the taught points,--.

Column 8, Line 14, after "storing" insert --a--.

UNITED STATES PATENT AND TRADEMARK OFFICE
CERTIFICATE OF CORRECTION

| | |
|---|---|
| PATENT NO. | : 7,373,220 B2 |
| APPLICATION NO. | : 10/787168 |
| DATED | : May 13, 2008 |
| INVENTOR(S) | : Atsushi Watanabe et al. |

It is certified that error appears in the above-identified patent and that said Letters Patent is hereby corrected as shown below:

Column 8, Line 16, after "for displaying" insert --an image of--.

Column 8, Line 17, change "movable" to --movable, with an operator,--.

Column 8, Lines 17-18, change "object with an operator;" to --object;--.

Column 8, Line 19, after "means for" insert --enabling--.

Column 8, Line 23, after "for displaying" insert --an image of--.

Column 8, Line 27, after "means for" insert --enabling--.

Column 8, Line 33, before "a part of" insert --an image of--.

Column 8, Line 34, after "with the" insert --display of the--.

Column 8, Line 37, after "for modifying" insert --at least one of--.

Column 8, Line 38, change "or" to --and--.

Column 8, Line 40, after "storing" insert --a--.

Column 8, Line 42, after "for displaying" insert --an image of--.

Column 8, Line 44, change "movable" to --movable with an operator--.

Column 8, Line 45, delete "with the operator".

Column 8, Line 46, change "for the operator to select" to --operable by the operator for selecting--.

Column 8, line 48, change "the" to --a--.

UNITED STATES PATENT AND TRADEMARK OFFICE
CERTIFICATE OF CORRECTION

| | |
|---|---|
| PATENT NO. | : 7,373,220 B2 |
| APPLICATION NO. | : 10/787168 |
| DATED | : May 13, 2008 |
| INVENTOR(S) | : Atsushi Watanabe et al. |

It is certified that error appears in the above-identified patent and that said Letters Patent is hereby corrected as shown below:

Column 8, Line 59, before "a part of" insert --an image of--.

Column 8, Line 60, after "with the" insert --display of the--.

Signed and Sealed this

Twenty-first Day of April, 2009

JOHN DOLL
*Acting Director of the United States Patent and Trademark Office*